United States Patent
Knop (10) Patent No.: US 7,240,693 B2
(45) Date of Patent: Jul. 10, 2007

(54) PRESSURE REGULATED SOLENOID VALVE HAVING INTEGRAL MOUNTING STRUCTURE

(75) Inventor: David G. Knop, Geneva, IL (US)

(73) Assignee: Robertshaw Controls Company, Richmond, VA (US)

( * ) Notice: Subject to any disclaimer, the term of this patent is extended or adjusted under 35 U.S.C. 154(b) by 244 days.

(21) Appl. No.: 11/094,349

(22) Filed: Mar. 30, 2005

(65) Prior Publication Data

US 2006/0219302 A1    Oct. 5, 2006

(51) Int. Cl.
    *F16K 21/00* (2006.01)
(52) U.S. Cl. .................. 137/613; 137/505.36; 137/550
(58) Field of Classification Search .............. 137/613, 137/505, 505.36, 544, 549, 550
    See application file for complete search history.

(56) References Cited

U.S. PATENT DOCUMENTS

| | | | |
|---|---|---|---|
| 4,267,859 A * | 5/1981 | Dykzeul | 137/550 |
| 5,921,275 A | 7/1999 | Knop et al. | |
| 5,941,218 A * | 8/1999 | DeLand et al. | 137/859 |
| 7,011,110 B1 * | 3/2006 | Stark | 137/630.14 |
| 7,073,490 B2 * | 7/2006 | Ricco et al. | 137/505 |

OTHER PUBLICATIONS

Elkay With Flexi-Guard; Installation, Care & Use Manual; Jun. 2005; 7 pages; 98047C.
Invensys Appliance Controls; Model S-86 and N-86 Icemaker Valves; Manual; Jul. 1999.
Tomlinson Industries; Pro-Flo; Manual; May 2003.

* cited by examiner

*Primary Examiner*—Kevin Lee
(74) *Attorney, Agent, or Firm*—Reinhart Boerner Van Deuren P.C.

(57) ABSTRACT

A regulator valve for managing a fluid in an appliance is provided. The regulator valve comprises a housing having an inlet and an outlet, a filter, a pressure regulator, a solenoid valve, a mounting structure, and a locking tab depending from the mounting structure. The inlet and outlet utilize quick connect adaptors. The pressure regulator maintains the fluid in the housing within a desired pressure range and the solenoid valve alternatively permits and prevents expulsion of the fluid from the outlet. The twist mount is inserted through a twist mount aperture on, e.g., a drinking fountain and rotated until a portion of the twist mount engages with a portion of the drinking fountain and the locking tab rests in a tab aperture on the drinking fountain. Therefore, the regulator valve is secured to the drinking fountain and can clean, regulate, and manage the fluid.

20 Claims, 6 Drawing Sheets

PRESSURE REGULATED SOLENOID VALVE HAVING INTEGRAL MOUNTING STRUCTURE

FIELD OF THE INVENTION

This invention relates generally to solenoid valves, pressure regulators, and filters used in appliances, such as drinking fountains, and methods of securing such components to the appliance.

BACKGROUND OF THE INVENTION

A typical appliance (e.g., a drinking fountain) can include various components such as a solenoid valve for controlling the expulsion of water from the fountain, a pressure regulator for maintaining the pressure of the water dispensed within a desired pressure range, and a filter for removing contaminants from the water.

Unfortunately, each of the components must be connected to a water source, to one of the other components, to a water delivery device (e.g., a bubbler), and the like, using a tube, a pipe, or some other type of conduit capable of distributing fluids. Each connection can be difficult to form, time consuming, and a potential source of fluid leaks.

Additionally, each of the components must be independently secured to the appliance. Such securement is typically performed using one of a variety of connecting devices such as fasteners, nut and bolt combinations, screws, rivets, and the like. Undesirably, each device usually has its own unique type of fastener. Therefore, securing the host of components to the appliance can be difficult, can require several different types of connections, and can be very time consuming. Therefore, a single device that can clean, regulate, and manage the fluid in the appliance, as well as be easily and quickly connected to the appliance, is desirable.

The invention provides such a device. These and other advantages of the invention, as well as additional inventive features, will be apparent from the description of the invention provided herein.

BRIEF SUMMARY OF THE INVENTION

In one aspect, the invention provides a regulator valve for managing a fluid in an appliance. The regulator valve comprises a housing having an inlet, an inlet filter section, a pressure regulation section, an outlet valving section, and an outlet in fluid communication therethrough. The housing further has a mounting structure including a mounting flange that has a locking tab depending therefrom. The filter is removably positioned in the inlet filter section of the housing for removing contaminants from the fluid. The pressure regulator is positioned in the pressure regulation section of the housing for regulating an outlet fluid pressure. The solenoid valve is positioned in the valving section of the housing for alternatively permitting expulsion of the fluid from the outlet and preventing expulsion of the fluid from the outlet.

In another aspect, the invention provides a regulator valve for cleaning, regulating a pressure of, and managing the flow of a fluid in an appliance. The regulator valve comprises a housing including, in fluid communication, an inlet for receiving the fluid, an outlet for expelling the fluid, a filter aperture, a regulator aperture, a solenoid aperture, and a mounting structure proximate the regulator aperture. The filter is removably disposed within the filter aperture of the housing for cleaning the fluid flowing therethrough. The pressure regulator is disposed within the regulator aperture of the housing for regulating the pressure of the fluid at an outlet thereof. The solenoid valve is secured to the solenoid aperture of the housing for managing the flow of fluid therein.

In a further aspect, the invention provides a regulator valve body for managing a fluid in an appliance. The regulator valve body comprises a housing having an inlet, an inlet filter section, a pressure regulation section, an outlet valving section, and an outlet in fluid communication therethrough. The housing further has a mounting structure proximate the pressure regulation section.

The inlet section defines a filter aperture at one end thereof, the filter aperture sized to accommodate a filter that may be removably positioned therein for removing contaminants from the fluid. The inlet section is sealed by an end cap removably affixed to the inlet aperture.

The pressure regulator section defines a regulator aperture at one end thereof, the regulator aperture sized to accommodate a pressure regulator that may be removably positioned therein for regulating an outlet fluid pressure. The pressure regulator section includes a regulator mounting cap removably positioned therein. The regulator mounting cap has an adjustment aperture positioned therein.

The outlet valving section is sized to accommodate a solenoid valve that may be positioned thereon for alternatively permitting expulsion of the fluid from the outlet and preventing expulsion of the fluid from the outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
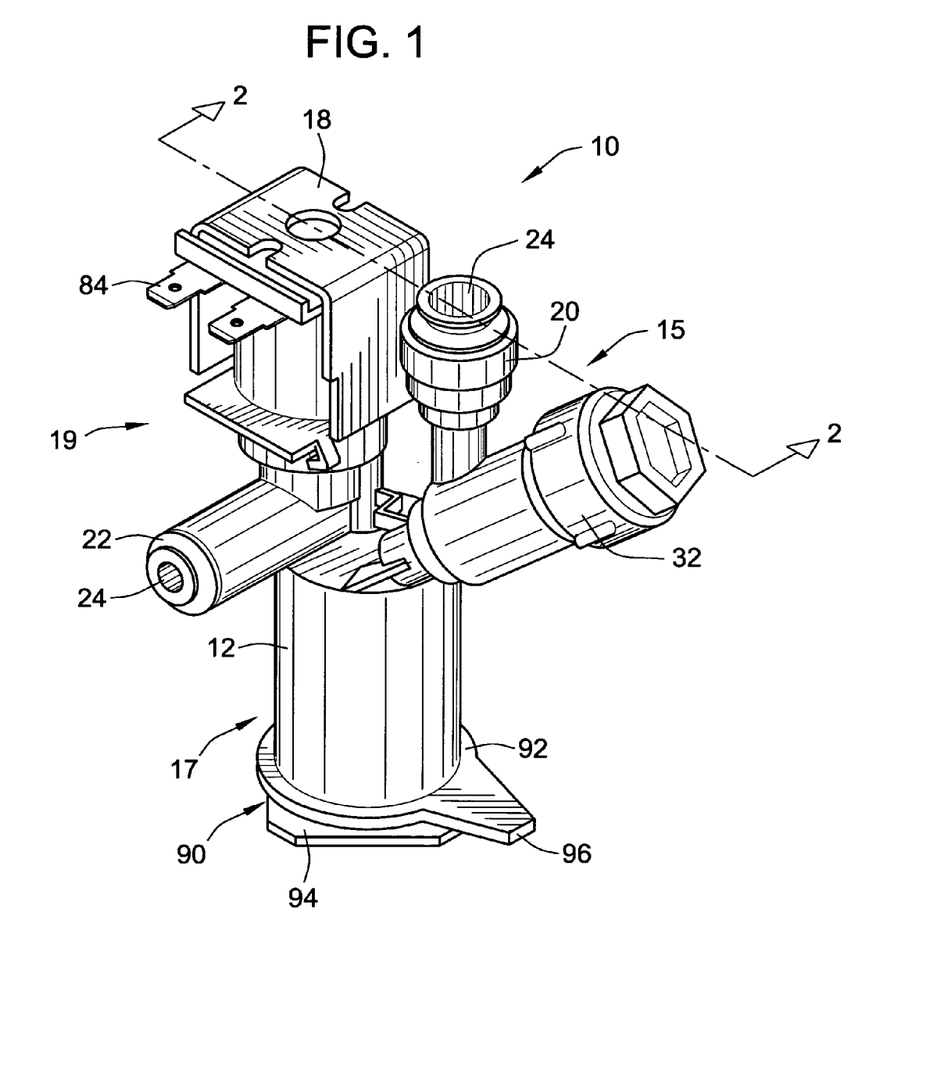
FIG. 1 is a perspective view of an exemplary embodiment of a regulator valve constructed in accordance with the teachings of the present invention.

Referring to FIG. 1, an embodiment of a regulator valve 10 constructed in accordance with the teachings of the present invention is illustrated. The regulator valve 10 includes a housing 12 that contains a filter 14 (see FIG. 2) within inlet filter section 15, a pressure regulator 16 (see FIG. 2) within the body pressure regulation section 17, and a solenoid valve 18 within outlet valving section 19. The integration of the filter 14, the pressure regulator 16 and the solenoid valve 18 within housing 12 eliminates the mounting and plumbing requirements for each of these components such that the regulator valve 10 functions as a single, integral unit requiring only a single inlet connection and a single outlet connection. This eliminates or greatly reduces the chance of leakage, the time and expense of installing and plumbing each component in an appliance (e.g., a drinking fountain), and the time and trouble servicing these components.

The housing 12 includes a single inlet 20 and a single outlet 22. The inlet 20 is configured to receive a flow of a fluid (e.g., water) from an external water supply, while the outlet 22 is configured to expel, in a preferred environment, a flow of the filtered, pressure regulated water to the bubbler 82 (see FIG. 4) of a drinking fountain. The inlet 20 and the outlet 22 are each, in a preferred embodiment, equipped with a quick connect fitting 24 such that a fluid supply line (not shown) can be quickly and easily connected to the inlet and a fluid delivery line (not shown) can be quickly and easily connected to the outlet without the need for tools. In other embodiments, a portion of the housing 12 proximate the inlet 20 and outlet 22 is threaded, includes hose barbs, and the like, for connecting the fluid supply line and the fluid delivery line in conventional fashion.

Figures 2, 3:
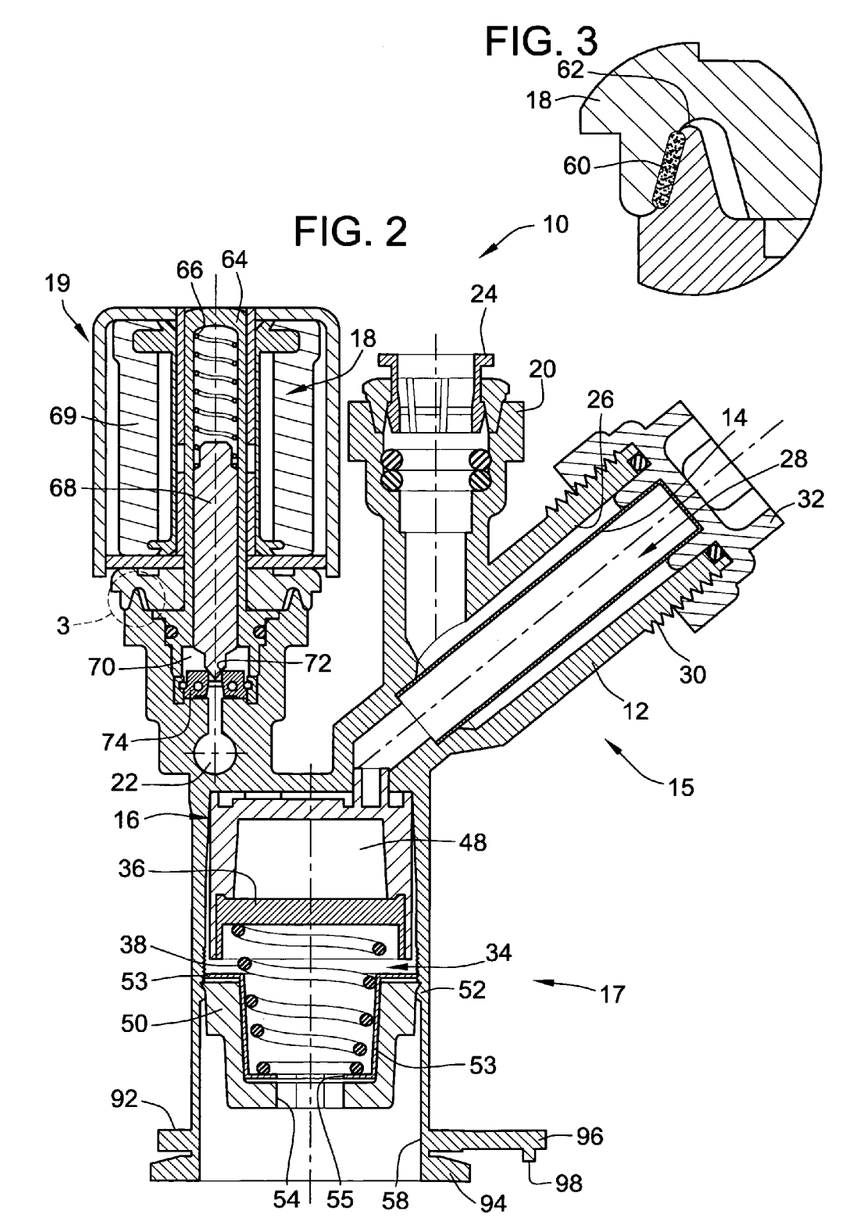
FIG. 2 is a cross-section view of the regulator valve of FIG. 1.
FIG. 3 is an exploded partial view of the regulator valve of FIG. 2 highlighting a weld portion.

Turning now to FIG. 2, the filter 14 is disposed proximate the inlet 20 and resides within a filter cavity 26 inside the inlet filter section 15 of housing 12. The filter 14 removes contaminants from the fluid that enters the regulator valve 10 through the inlet 20. The filter 14 is dimensioned such that it is insertable into, and removable from, the inlet filter section 15 of housing 12 through a filter aperture 28 to allow replacement and servicing of the filter 14. Threads 30 are included on the end of the inlet filter section 15 proximate the filter aperture 28 to allow a threaded filter cap 32 to be secured to the housing 12 to seal the filter aperture 28 or to be disengaged from the housing 12 to open the filter aperture 28. With the threaded filter cap 32 removed from the housing 12, the filter 14 can be withdrawn from the filter cavity 26 and inspected. Upon inspection, the filter 14 can be selectively cleaned (if needed), reinserted, or discarded and replaced by a new, fresh filter. After the filter 14 has been reinserted or replaced, the threaded filter cap 32 is once again threadably secured to the housing 12 where the reinserted or replaced filter can begin or continue to remove contaminants. The filter 14 can be cylindrical, as shown in FIG. 2, or otherwise shaped.

Once the water has entered inlet 20 and has been filtered by filter 14, the water enters the pressure regulation section 17 of the housing 12. A pressure regulator 16 is disposed within the pressure regulation section 17 of housing 12 and generally resides in a regulator cavity 34. Preferably, the pressure regulator 16 is one commercially available from Elkay Manufacturing Company of Oakbrook, Ill. The conventional pressure regulator 16 comprises a diaphragm 36 and a spring 38. The spring 38 in the pressure regulator 16 is disposed, and is preferably adjustably compressed, between the diaphragm 36 and a threaded insert 53 proximate the regulator mounting cap 50. The regulator mounting cap 50 engages with an engaging portion 52 (e.g., threads, a detent) disposed on a portion of the housing 12 inside the regulator cavity 34 to secure the pressure regulator 16 within the housing 12.

The regulator mounting cap 50 includes a cap aperture 54 or slot that is dimensioned to receive a torque-producing device (not shown) such as, for example, a flat-head screwdriver, a Phillips screwdriver, a hex wrench, and the like. The threaded insert 53 also includes an aperture 55 or slot that is dimensioned to receive the torque-producing device. Therefore, the threaded insert 53 can be threadably driven inwardly by the torque-producing device toward the diaphragm 36 to compress the spring 38 or, alternatively, threadably driven outwardly away from the diaphragm to decompress or expand the spring. By rotating the threaded insert 53 in one direction or another, the amount of force and bias that the spring 38 exerts upon the diaphragm 36 is adjusted. Resultantly, the pressure regulator 16 can maintain the fluid that flows from the diaphragm outlet 42 to the outlet valving section 19 within a desired pressure range no matter what pressure the fluid has at the inlet 20.

In one embodiment, the pressure regulator 16 is removable from, and insertable into, the housing 12 by threadably driving the regulator mounting cap 50 away from the diaphragm 36 and entirely out of the housing through regulator aperture 58. Thereafter, the pressure regulator 16, including the diaphragm 36 and the spring 38, can be extracted from the housing 12 for replacement, inspection, adjustment, and the like. In other words, the pressure regulator 16 can advantageously be easily removed from the housing for servicing without having to undesirably disassemble the regulator valve 10, other components in the regulator valve, and/or the drinking fountain itself.

The solenoid valve 18 is disposed proximate the outlet 22 on the housing 12. In a preferred embodiment, as depicted in detail in the exploded section illustration of FIG. 3, the solenoid 18 is secured to the housing 12 by a weld portion 60 proximate a solenoid aperture 62 using a spin, ultrasonic, or other welding process. As such, the solenoid valve 18 becomes an integral part of the housing 12 of regulator valve 10. In other embodiments, the solenoid valve 18 is secured to, and becomes and integral part-of, the housing 12 using other securing means such as, for example, a threaded connector, snap or friction fit, and the like.

Referring back to FIG. 2, the solenoid valve 18 comprises a guide tube 64, a solenoid spring 66, an armature 68, a coil 69, a solenoid valve cavity 70, and a seat 72. The seat 72 and the spring 66 are disposed at opposing ends of the armature 68. When the coil 69 of the solenoid valve 18 is energized, the armature 68 compresses the solenoid spring 66 and disengages the seat 72 from a sealing flange 74 in the housing 12. Resultantly, the fluid is permitted to flow from the solenoid valve cavity 70 to the outlet 22. In contrast, when the coil 69 of the solenoid valve 18 is de-energized, the solenoid spring 66 forcibly biases the armature 68 and the seat 72 towards the sealing flange 74 such that the seat 72 engages with the sealing flange 74. Resultantly, the fluid is prevented from flowing from the solenoid valve cavity 70 as well as from the outlet 22.

In one exemplary embodiment, the solenoid valve 18 is a direct-acting solenoid. In other embodiments, the solenoid valve 18 can also be an indirect-acting solenoid valve, a pilot operated solenoid valve, a solenoid valve with a lift diaphragm, and the like.

As will now be recognized by those skilled in the art from the foregoing description, the relative positions of the pressure regulator 16 and the solenoid valve 18 can be modified without disrupting operation of the regulator valve 10. For example, using a flow of water traveling from the inlet 20 to the outlet 22 as a reference, the solenoid valve 18 can be either downstream or upstream of the pressure regulator 16. Moreover, the orientation of one or more of the components, devices, and/or parts of the regulator valve 10 can be modified such that the housing 12 has different geometries to accommodate different installation environments.

Figure 4:
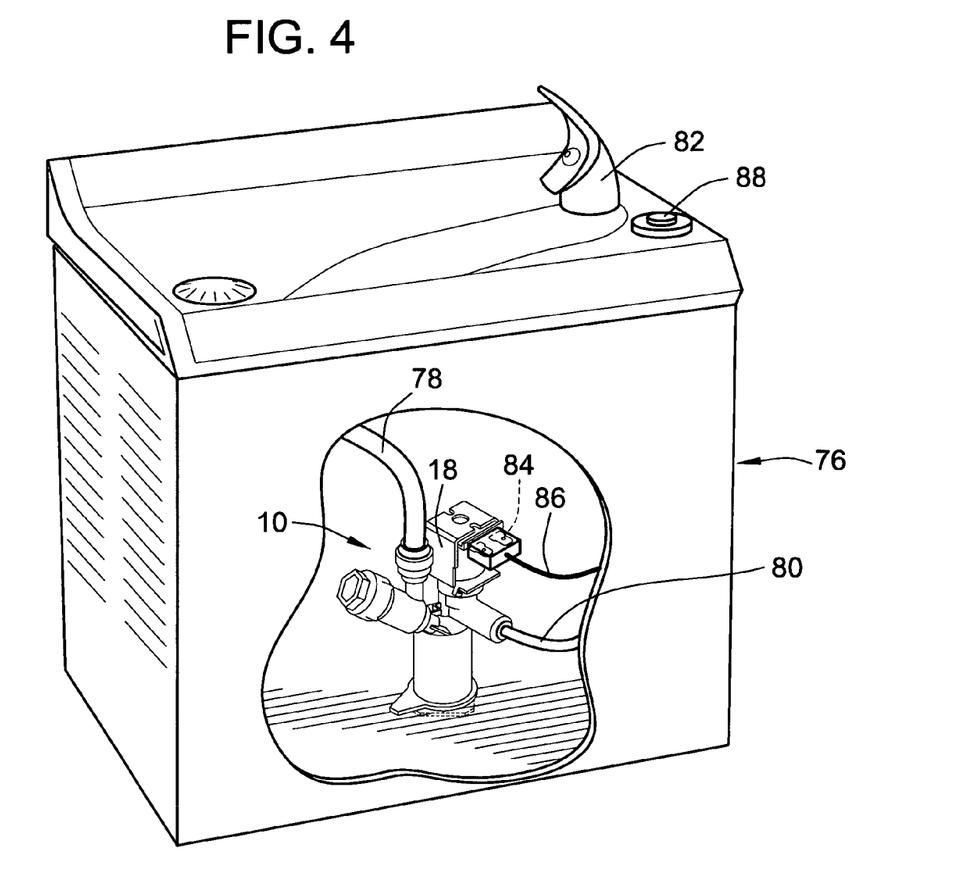
FIG. 4 is a perspective view of the regulator valve of FIG. 1 disposed within a drinking fountain.

As shown in FIG. 4, the regulator 10 valve can be employed in an appliance such as, for example, a drinking fountain 76. When used by the drinking fountain 76, the inlet 20 of the regulator valve 10 is connected to a water supply conduit 78, the outlet 22 of the regulator valve 10 is connected to a water delivery conduit 80 that delivers the water to a bubbler 82 from which the water is dispensed, and an electrical connector 84 is connected to a power supply line 86 associated with a push button 88. When the push button 88 is depressed by a user, the solenoid valve 18 is energized to permit a regulated flow of water to be supplied to the bubbler 82.

Figure 5:
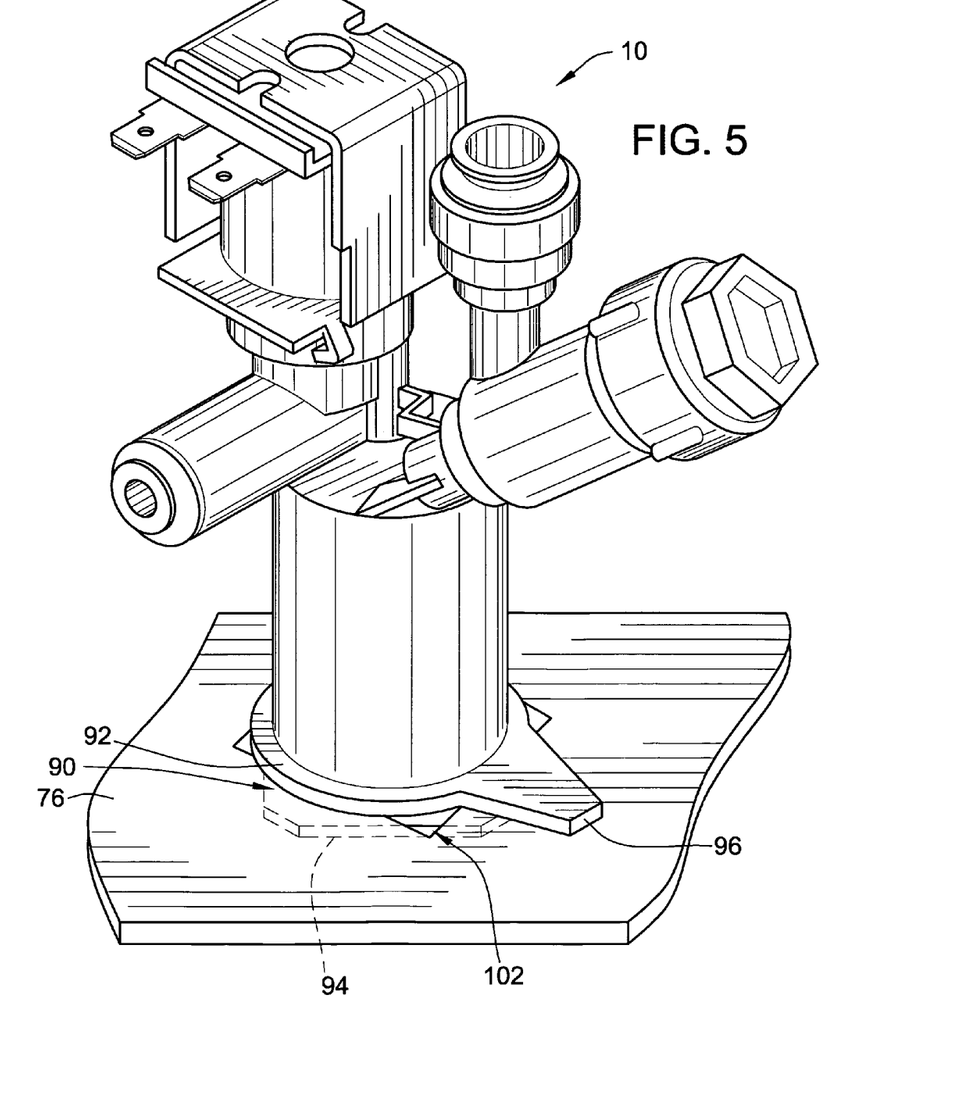
FIG. 5 is a perspective view of the regulator valve of FIG. 1 engaged to the portion of the drinking fountain of FIG. 4 using a twist mount.
Figure 6:
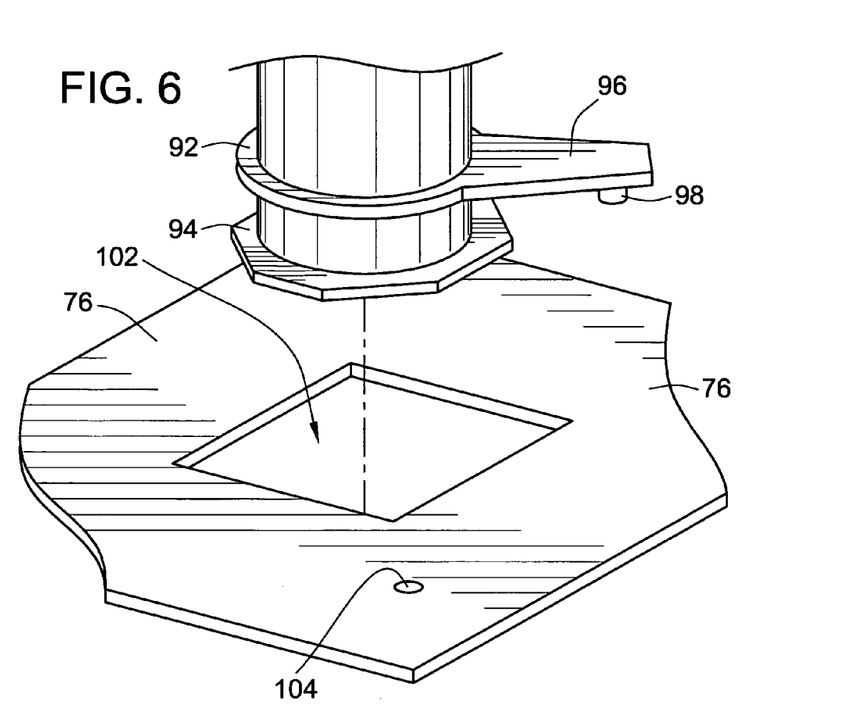
FIG. 6 is an exploded perspective view showing the relationship between the regulator valve of FIG. 1, the portion of the drinking fountain of FIG. 4, and the twist mount of FIG. 5.
Figure 7:
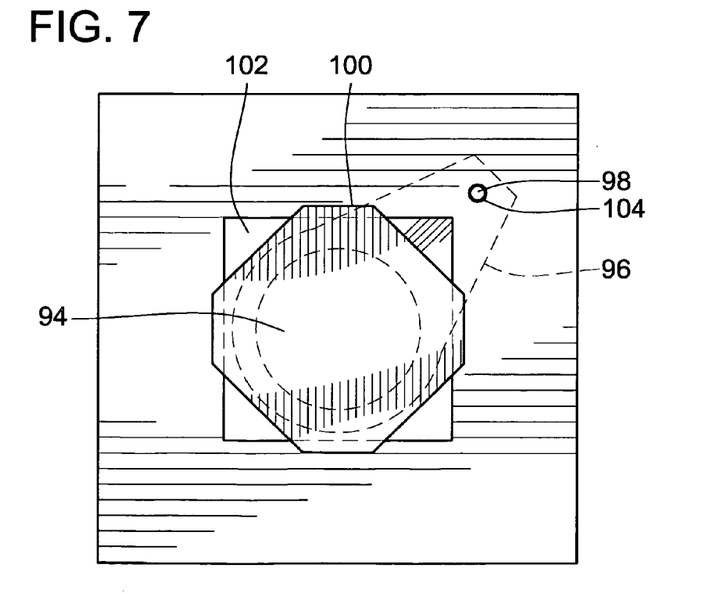
FIG. 7 is a bottom plan view of the regulator or FIG. 1 secured within the portion of the drinking fountain of FIG. 4.

As shown in FIGS. 5-7, in an exemplary embodiment the housing 12 of the regulator valve 10 further comprises a mounting structure such as, for example, a twist mount 90. The twist mount 90 includes an upper portion 92 and a lower portion 94. In a preferred embodiment, the twist mount 90 also includes a mounting flange 96 extending outwardly from the upper portion. The mounting flange 96 includes a depending locking tab 98 that engages a locking tab aperture 104 in the drinking fountain. The twist mount 90 permits the regulator valve 10 to be quickly and easily connected to and secured in the drinking fountain 76 without requiring the use of tools.

In one embodiment, the lower portion 94 of the twist mount 90 is generally square-shaped but has beveled corners 100. The generally-square shape of the twist mount 90 permits the lower portion 94 of the twist mount to be inserted into a corresponding square aperture 102 that has been punched or otherwise formed in the drinking fountain 76. Once inserted, the regulator valve 10 is rotated, preferably about forty-five degrees, until the beveled corners 100 slide upon and over portions of the drinking fountain 76 as shown in FIG. 7. As illustrated by collectively viewing FIGS. 5 and 7, the upper and lower portions 92, 94 of the twist mount 90 essentially straddle and/or clamp the mounting wall of the drinking fountain 76. If the upper and lower portions 92, 94 have an appropriate amount of tolerance (e.g., opposing space) between them, friction alone can retain the regulator valve 10 in place on or within the drinking fountain 76.

Despite the frictional securement provided by the upper and lower portions 92, 94, in a preferred embodiment, the locking tab 98 is provided to engage with a locking tab aperture 104 that has been punched or otherwise formed in the drinking fountain 76 when the regulator valve 10 has been rotated about forty-five degrees. Engagement of the locking tab 98 with the locking tab aperture 104 secures the regulator valve 10 in position within the drinking fountain 76. As a result, inadvertent removal and/or loosening of the regulator valve 10 from the drinking fountain 76 is prevented and/or inhibited.

Preferably, the locking tab 98 can, when desired, be disengaged from the locking tab aperture 104 by biasing the resilient mounting flange 96 upwardly and/or otherwise to remove the locking tab 98 out of the locking tab aperture 104. With the locking tab 98 disengaged from the locking tab aperture 104, the twist mount 90 can be rotated to permit removal of the regulator valve 10 from the square aperture 102 for inspection, replacement, cleaning, removal, and the like.

Figure 8:
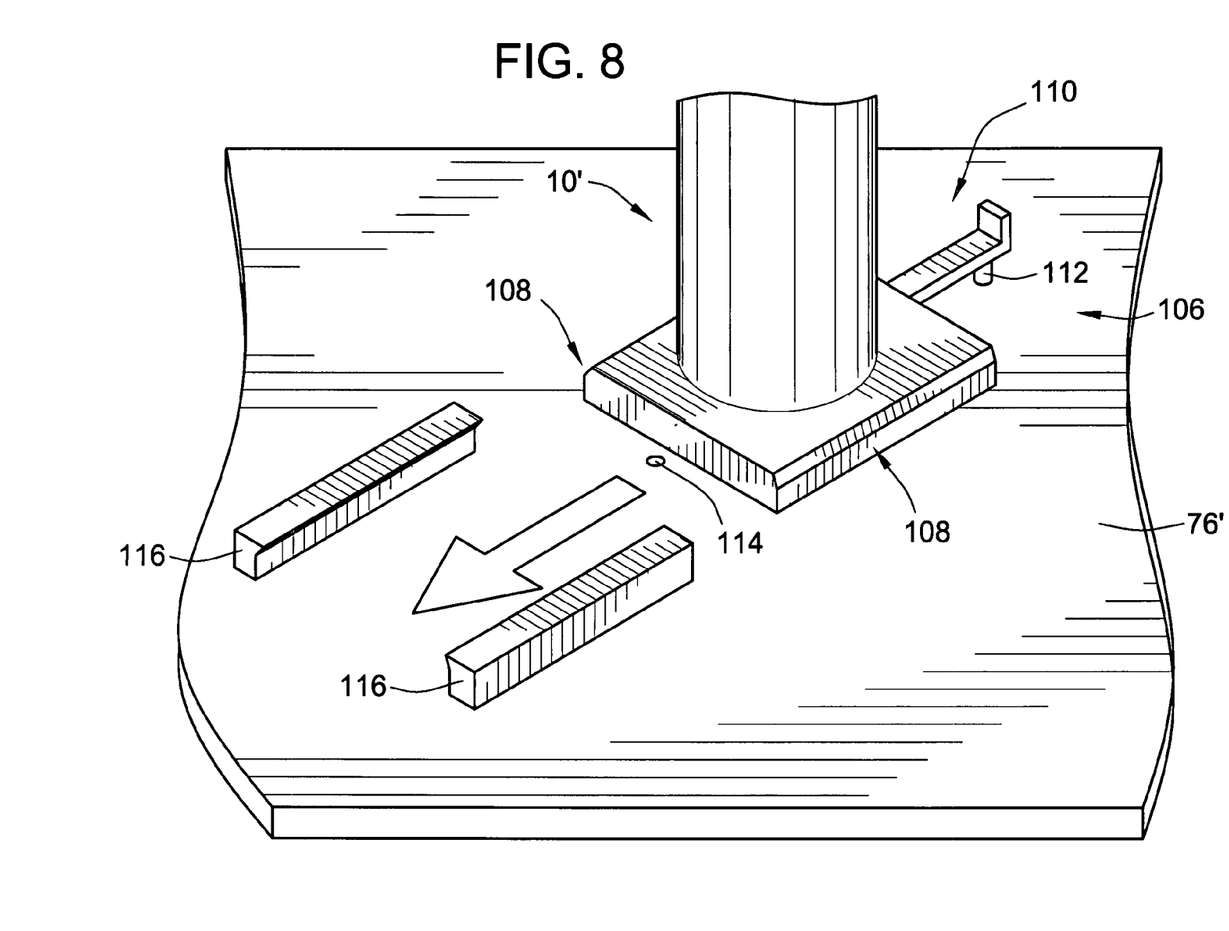
FIG. 8 is a partial perspective view of the regulator valve of FIG. 1 employing a slide mount to secure the regulator valve to the drinking fountain of FIG. 4.

As illustrated in FIG. 8, in another exemplary embodiment the housing 12' of the regulator valve 10' further comprises a mounting structure such as, for example, a slide mount 106. The slide mount 106 includes peripheral portions 108. In a preferred embodiment, the slide mount 106 also includes a mounting flange 110 extending outwardly from the slide mount. The mounting flange 110 includes a depending locking tab 112 that engages a locking tab aperture 114 in the drinking fountain 76'. The slide mount 106 permits the regulator valve 10' to be quickly and easily connected to and secured in the drinking fountain 76' without requiring the use of tools.

In one embodiment, the peripheral portions 108 of the slide mount 106 are beveled as shown in FIG. 8. The beveled peripheral portions 108 and the generally-square shape of the slide mount 106 permits the slide mount to be slideably inserted into a corresponding fitting 116 that has been formed on the drinking fountain 76'. Because the fittings 116 are slightly smaller than the peripheral portions 108 and/or the slide mount 106, the fittings 116 essentially clamp the peripheral portions 108 of the drinking fountain 76' in place using friction. If an appropriate amount of tolerance (e.g., opposing space) is left between the fitting 116 and the drinking fountain 76', friction alone can retain the regulator valve 10' in place on or within the drinking fountain.

Despite the frictional securement provided by the fittings 116, in a preferred embodiment, the locking tab 112 is provided to engage with a locking tab aperture 114 that has been punched or otherwise formed in the drinking fountain 76' when the peripheral portions 108 have been slid into engagement with fittings 116. Engagement of the locking tab 112 with the locking tab aperture 114 secures the regulator valve 10' in position within the drinking fountain 76'. As a result, inadvertent removal and/or loosening of the regulator valve 10' from the drinking fountain 76' is prevented and/or inhibited.

Preferably, the locking tab 112 can, when desired, be disengaged from the locking tab aperture 114 by biasing the resilient mounting flange 110 upwardly and/or otherwise to remove the locking tab 112 out of the locking tab aperture 114. With the locking tab 112 disengaged from the locking tab aperture 114, the slide mount 106 can be slid to permit removal of the regulator valve 10' from the beneath the fittings 116 for inspection, replacement, cleaning, removal, and the like.

In operation, the regulator valve 10 is initially secured to the drinking fountain 76 using either the twist mount 90 or the slide mount 106. When using the twist mount 90, the lower portion 94 is inserted into and through the square aperture 102 and, thereafter, rotated relative to the drinking fountain 76. Preferably, the rotation continues for about forty-five degrees until the beveled corners 100 have slid over (under) portions of the drinking fountain 76 and/or the locking tab 98 has engaged with the locking tab aperture 104. When using the slide mount 106, the peripheral portions 108 are slid into engagement with the fittings 116 until the locking tab 112 engages with the locking tab aperture 114. In each case, the regulator valve 10 (or 10') is now secured to the drinking fountain 76 (or 76'). For clarity, regulator valves 10, 10' and drinking fountains 76, 76' will hereinafter be collectively referred to as simply regulator valve 10 and drinking fountain 76.

Once the regulator valve 10, is secured to the drinking fountain 76, the inlet 20, outlet 22, and electrical connector 84 are coupled with the water supply conduit 78, the water delivery conduit 80, and the power supply line 86, respectfully. As such, fluid communication between the water supply conduit 78 and the water delivery conduit 80 is possible and the solenoid 18 can be energized and de-energized.

When a user of the drinking fountain 76 depresses the push button 88, the solenoid valve 18 is energized and the seat 72 disengages from the sealing flange 74. Thereafter, water begins to flow through the regulator valve 10. Initially, the water flows into the inlet 20 from the water supply conduit 78 and passes through the filter 14 such that contaminants in the water are removed. From there, the water flows through the diaphragm inlet and fills the diaphragm cavity 48. The regulator 16, using the diaphragm 36 and spring 38, balances the water pressure with the biasing force of the spring 38. If the pressure of the water at the inlet 20 increases, the force of the water against the outer basin exceeds the force of the spring 38, the diaphragm 36 moves toward the regulator mounting cap 50, and the orifice permitting water to flow into the diaphragm cavity 48 is reduced as the plug moves relative to the housing 12. In contrast, if the pressure of the water at the inlet 20 decreases, the force of the spring 38 exceeds the force of the water against the outer basin, the diaphragm 36 moves away from the regulator mounting cap 50, and the orifice permitting water to flow into the diaphragm cavity 48 is increased as the plug moves relative to the housing 12. Therefore, no matter what pressure the water has at the inlet 20, the pressure regulator 16 adjusts that pressure to within a desired pressure range.

The pressure regulated water next flows out of the diaphragm cavity 48 and enters the solenoid cavity 70. Since the solenoid valve 18 has been energized, the water is permitted to flow from the solenoid cavity 70 past the seat 72. The water is then expelled from the regulator valve 10 at the outlet 22 and enters the water delivery conduit 80. From there, the water travels to the bubbler 82 where the water is ejected in a stream having a height that corresponds to the desired pressure range.

When the push button 88 is released, the solenoid valve 18 is de-energized and the seat 72 engages with the sealing flange 74 to form a seal. With the seal formed, the flow of water inside the regulator valve 10 is halted until the push button 88 is once again depressed.

Advantageously, the regulator valve 10 of the present invention provides substantial cost reductions over previous, distributed component installations, as well as improvements to quality and serviceability for the regulator valve. By reducing the number of plumbing connections that need to be made, the reliability of the valve is greatly enhanced, and the time and effort to install and repair is greatly reduced. The inclusion of quick connect fittings further reduces the time and effort necessary to install the valve 10, and eliminates the necessity of using tools. Further, the twist lock 90 eliminates the necessity of using tools to install the valve 10 itself in its operating environment. The regulator valve 10 is employable within newly manufactured drinking fountains 76 and, due to the regulator valve's universal nature, adaptable to existing drinking fountains as well.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A regulator valve for managing a fluid in an appliance, comprising:
    a housing having an inlet, an inlet filter section, a pressure regulation section, an outlet valving section, and an outlet in fluid communication therethrough, the housing further having a mounting structure including a mounting flange having a locking tab depending therefrom;
    a filter removably positioned in the inlet filter section of the housing for removing contaminants from the fluid;
    a pressure regulator positioned in the pressure regulation section of the housing for regulating an outlet fluid pressure; and
    a solenoid valve positioned in the valving section of the housing for alternatively permitting expulsion of the fluid from the outlet and preventing expulsion of the fluid from the outlet.

2. The regulator valve of claim 1, wherein the mounting structure comprises a twist mount having a lower portion that is generally square with beveled corners and an upper portion forming the mounting flange.

3. The regulator valve of claim 1, wherein the mounting structure comprises a slide mount having peripheral portions that are engageable with fittings on the appliance.

4. The regulator valve of claim 1, wherein the inlet filter section of the housing defines a filter aperture having a threaded end portion thereof, and a filter cap releasably threaded thereon.

5. The regulator valve of claim 1, wherein at least one of the inlet and the outlet comprise a quick connect coupling.

6. The regulator valve of claim 1, wherein the pressure regulation section of the housing defines a regulator aperture and includes a regulator mounting cap removably positioned therein, the regulator mounting cap having an adjustment aperture positioned therein, the adjustment aperture providing access to the pressure regulator for adjustment.

7. The regulator valve of claim 1, wherein the valving section of the housing is positioned upstream of the pressure regulation section of the housing.

8. The regulator valve of claim 1, wherein the valving section of the housing is positioned downstream of the pressure regulation section of the housing.

9. The regulator valve of claim 1, wherein the solenoid valve is selected from the group consisting of a direct-acting solenoid valve, an indirect-acting solenoid valve, a pilot operated solenoid valve, and a solenoid valve with a lift diaphragm.

10. The regulator valve of claim 1, wherein the solenoid valve permits flow of the fluid through the housing when energized and prevents flow of the fluid when de-energized.

11. The regulator valve of claim 1, wherein the solenoid valve is secured in the valving section of the housing by spin welding.

12. A regulator valve for cleaning, regulating a pressure of, and managing the flow of a fluid in an appliance, the regulator valve comprising:
  a housing including in fluid communication:
    an inlet for receiving the fluid;
    an outlet for expelling the fluid;
    a filter aperture;
    a regulator aperture;
    a solenoid aperture; and
    a mounting structure proximate the regulator aperture;
  a filter removably disposed within the filter aperture of the housing for cleaning the fluid flowing therethrough;
  a pressure regulator disposed within the regulator aperture of the housing for regulating the pressure of the fluid at an outlet thereof; and
  a solenoid valve secured to the solenoid aperture of the housing for managing the flow of fluid therein.

13. The regulator valve of claim 12, wherein the solenoid valve is secured to the housing by spin welding.

14. The regulator valve of claim 12, wherein the mounting structure includes a mounting flange extending therefrom, the mounting flange including a depending locking tab.

15. The regulator valve of claim 12, wherein each of the inlet and the outlet include quick connect couplings.

16. The regulator valve of claim 12, wherein the mounting structure comprises an upper and a lower portion positioned in spaced relation to one another to accommodate positioning of an appliance mounting surface therebetween, the lower portion configured generally square having beveled corners to allow twist lock mounting within the appliance.

17. The regulator valve of claim 12, wherein the mounting structure comprises a slide mount having beveled peripheral portions that are engageable with fittings on the appliance.

18. A regulator valve body for managing a fluid in an appliance, comprising:
  a housing having an inlet, an inlet filter section, a pressure regulation section, an outlet valving section, and an outlet in fluid communication therethrough, the housing further having a mounting structure proximate the pressure regulation section;
  the inlet section defining a filter aperture at one end thereof, the filter aperture sized to accommodate a filter that may be removably positioned therein for removing contaminants from the fluid, the inlet section being sealed by an end cap removably affixed to the inlet aperture;
  the pressure regulator section defining a regulator aperture at one end thereof, the regulator aperture sized to accommodate a pressure regulator that may be removably positioned therein for regulating an outlet fluid pressure, the pressure regulator section including a regulator mounting cap removably positioned therein, the regulator mounting cap having an adjustment aperture positioned therein; and
  the outlet valving section sized to accommodate a solenoid valve that may be positioned thereon for alternatively permitting expulsion of the fluid from the outlet and preventing expulsion of the fluid from the outlet.

19. The regulator valve body of claim 18, wherein the mounting structure includes a mounting flange having locking tab depending therefrom.

20. The regulator valve body of claim 18, wherein the inlet and the outlet include a quick connect coupling.

* * * * *